United States Patent
Fuleshwar Prasad et al.

(10) Patent No.: US 10,516,456 B1
(45) Date of Patent: Dec. 24, 2019

(54) SYSTEM AND METHOD TO DYNAMICALLY OPTIMIZE ANTENNA PERFORMANCE

(71) Applicant: BLACKBERRY LIMITED, Waterloo (CA)

(72) Inventors: Mahendra Fuleshwar Prasad, Waterloo (CA); Ying Tong Man, Waterloo (CA); Jason Wayne Jantzi, Waterloo (CA)

(73) Assignee: BLACKBERRY LIMITED, Waterloo (CA)

( * ) Notice: Subject to any disclaimer, the term of this patent is extended or adjusted under 35 U.S.C. 154(b) by 0 days.

(21) Appl. No.: 16/174,947

(22) Filed: Oct. 30, 2018

(51) Int. Cl.
| | | |
|---|---|---|
| *H04B 1/00* | (2006.01) | |
| *H04B 17/00* | (2015.01) | |
| *H04B 7/06* | (2006.01) | |
| *H04B 7/08* | (2006.01) | |
| *H04B 7/0413* | (2017.01) | |
| *H04W 84/18* | (2009.01) | |

(52) U.S. Cl.
CPC ............. *H04B 7/061* (2013.01); *H04B 1/006* (2013.01); *H04B 1/0057* (2013.01); *H04B 7/0413* (2013.01); *H04B 7/0808* (2013.01); *H04W 84/18* (2013.01)

(58) Field of Classification Search
CPC ...... H04B 7/061; H04B 7/0413; H04B 1/006; H04B 7/0808; H04B 1/0057; H04B 17/38; H04W 84/18; H04W 52/0245
See application file for complete search history.

(56) References Cited

U.S. PATENT DOCUMENTS

| | | | |
|---|---|---|---|
| 8,315,572 B2 | 11/2012 | Herscovich et al. | |
| 8,391,876 B2 | 3/2013 | Gao et al. | |
| 8,417,259 B2 * | 4/2013 | Sennett | H04B 17/0085 370/252 |
| 8,787,266 B2 | 7/2014 | Matischek et al. | |
| 9,161,386 B1 * | 10/2015 | Beghini | H04W 88/06 |
| 9,609,630 B2 | 3/2017 | Ali et al. | |
| 9,807,777 B2 | 10/2017 | Kim et al. | |
| 9,930,549 B2 | 3/2018 | Åkerberg et al. | |
| 2009/0021325 A1 * | 1/2009 | Lee | H03H 7/40 333/124 |
| 2012/0243584 A1 * | 9/2012 | Honda | H04B 7/0811 375/219 |
| 2015/0348058 A1 * | 12/2015 | Liu | G06Q 30/0251 705/14.49 |
| 2016/0157242 A1 | 6/2016 | van den Bosch et al. | |
| 2016/0204499 A1 * | 7/2016 | Toh | H01Q 1/24 343/702 |
| 2017/0094591 A1 * | 3/2017 | Namboodiri | H04B 17/318 |
| 2018/0215395 A1 * | 8/2018 | Keany | G06K 9/6267 |
| 2018/0324897 A1 * | 11/2018 | Wu | G06F 1/163 |

* cited by examiner

*Primary Examiner* — Andrew Wendell (74) *Attorney, Agent, or Firm* — Perry + Currier Inc.

(57) ABSTRACT

A method of dynamically optimizing antenna performance in a wireless sensor network is set forth, comprising scanning multiple frequency bands via successive ones of a plurality of antennae for receiving indications of signal strength at each antenna for each scanned frequency band; and selecting one of said plurality of antennae having highest signal strength over one of said multiple frequency bands for communication over said one of said multiple frequency bands.

17 Claims, 7 Drawing Sheets

SYSTEM AND METHOD TO DYNAMICALLY OPTIMIZE ANTENNA PERFORMANCE

FIELD

The specification relates generally to communication systems, and specifically to a system and method for dynamically optimizing antenna performance in a wireless sensor network.

BACKGROUND

Wireless sensor networks are known for use in commercial vehicles such as intermodal shipping containers, flatbed trucks, corrugated door trailers, etc. One application of such wireless sensor networks is Tire Pressure Monitoring Systems (TPMS) for monitoring the pressure in all the tires of a truck, which helps prevent dangerous tire blowouts and assists in reducing tire wear and improving fuel efficiency. Such systems use pressure sensors that are embedded either on the rim of the wheel or on wall of the tire (direct TPMS) which communicates using short range wireless communication via a gateway to an Electronic Control Unit (ECU) in the vehicle and to a remote server for maintenance/diagnostics etc. at remote location. The system gathers pressure data from all of the wheels in the vehicle and displays the pressure values to the driver, along with a warning if boundary conditions are exceeded.

A typical wireless sensor network comprises multiple sensor modules and one or more gateways. Sensor modules communicate with a gateway via short range RF technologies such as 2.4 GHz Bluetooth Low Energy (BLE), 802.15.4 low-rate wireless communications, ISM band Sub-GHz 434 MHz, 490 MHz, 868 MHz, 902-928 MHz, etc. Sensor modules are typically battery powered whereas gateways may either be connected to a power source or battery.

In a typical wireless sensor network for use in a vehicle, the sensors may be located in the chassis, spanning both the frame and the wheel hubs. One consideration when implementing such a network is the number of gateways needed for communication with all of the sensors, as well as optimal location of the gateways relative to the sensors. Depending on the mounting position of the gateways, one or more of the sensor modules may not be in line of sight of the gateways, such that the sensors may be unable to communicate reliably with the gateways due to higher path losses and poor sensitivity resulting from small antenna volume.

An aspect of the specification provides a method of dynamically optimizing antenna performance in a wireless sensor network, comprising scanning multiple frequency bands via successive ones of a plurality of antennae for receiving indications of signal strength at each antenna for each scanned frequency band; and selecting one of said plurality of antennae having highest signal strength over one of said multiple frequency bands for communication over said one of said multiple frequency bands.

A further aspect of the specification provides system for dynamically optimizing antenna performance in a wireless sensor network, comprising, a plurality of sensor modules; at least one gateway comprising a plurality of antennae and a transceiver; said transceiver including an RF (radio frequency) front end and a controller configured for selectively connecting said RF front end to said plurality of antennae, said controller configured to: scan multiple frequency bands via successive ones of said plurality of antennae for receiving indications of signal strength at each antenna for each scanned frequency band; and selectively connecting said RF front end to one of said plurality of antennae having highest signal strength over one of said multiple frequency bands for communication over said one of said multiple frequency bands.

A further aspect of the specification provides a gateway for communicating with a plurality of sensor modules via RF (radio frequency) and with a remote server via a cellular network, said gateway comprising a cellular modem; an RF transceiver having a controller and an RF front end; a plurality of antennae; and a controller for selectively connecting said RF front end to said plurality of antennae, said controller configured to: scan multiple frequency bands via successive ones of said plurality of antennae for receiving indications of signal strength at each antenna for each scanned frequency band; and selectively connecting said RF front end to one of said plurality of antennae having highest signal strength over one of said multiple frequency bands for communication over said one of said multiple frequency bands.

Yet another aspect of the specification provides a non-transient computer readable medium containing program instructions for causing a computer to perform a method of dynamically optimizing antenna performance in a wireless sensor network, comprising: scanning multiple frequency bands via successive ones of a plurality of antennae for receiving indications of signal strength at each antenna for each scanned frequency band; and selecting one of said plurality of antennae having highest signal strength over one of said multiple frequency bands for communication over said one of said multiple frequency bands.

BRIEF DESCRIPTIONS OF THE DRAWINGS

Embodiments are described with reference to the following figures, in which.

DETAILED DESCRIPTION

Figure 1:
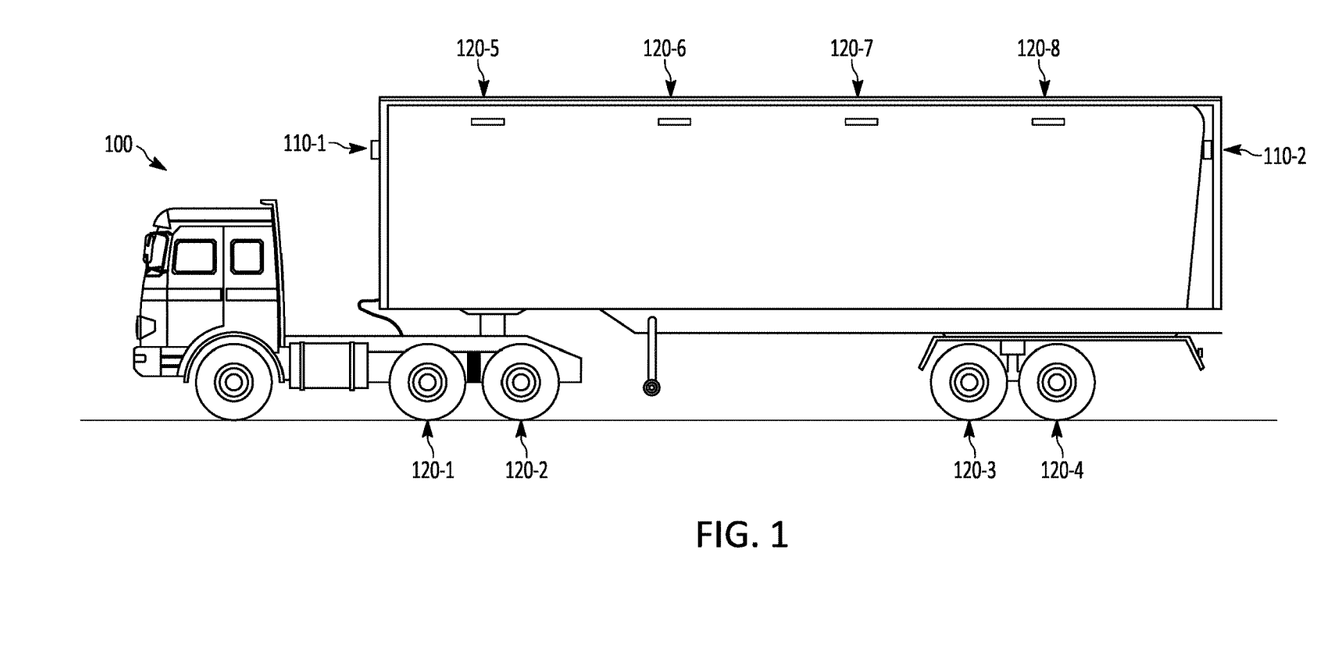
FIG. 1 depicts a vehicle having a wireless sensor network including a plurality of gateways in communication with a plurality of sensor modules, according to a non-limiting embodiment.
Figure 2:
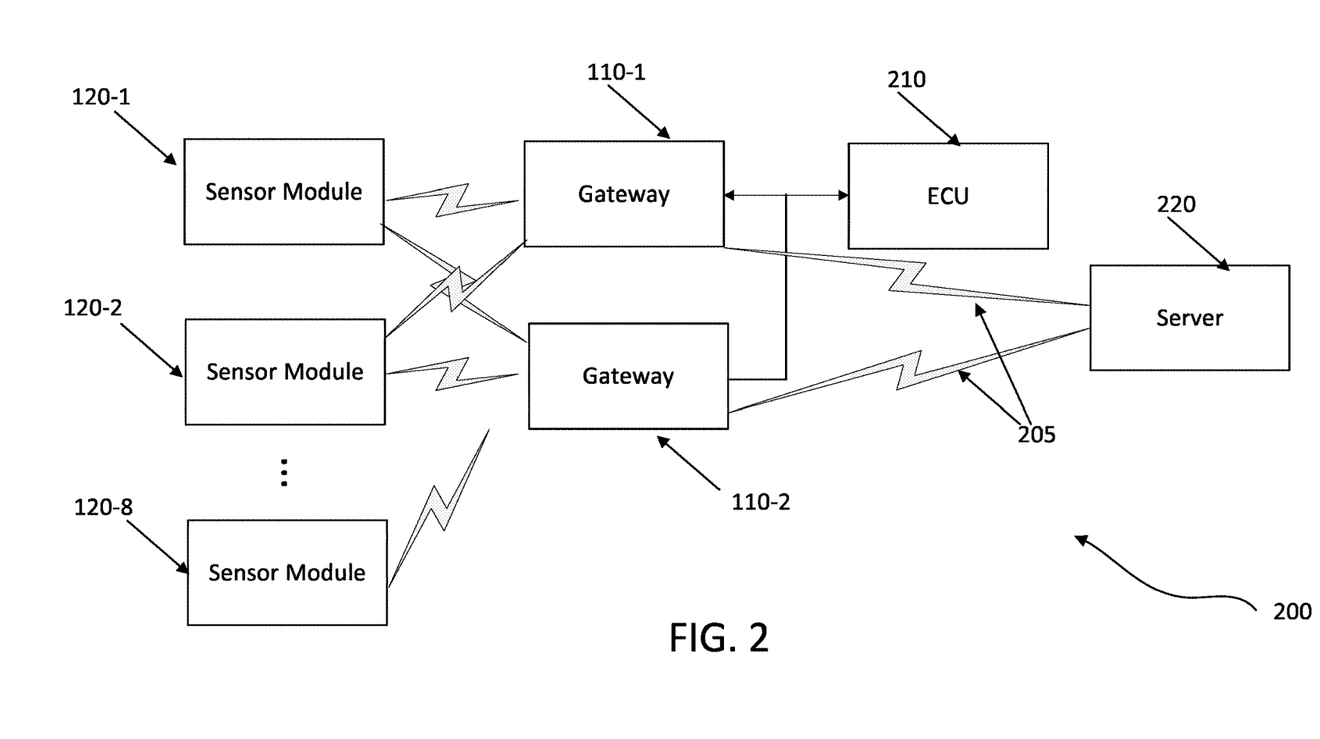
FIG. 2 is a block diagram of the wireless sensor network of FIG. 1 comprising a gateway and a plurality of network modules, according to a non-limiting embodiment.

FIG. 1 depicts a vehicle 100, such as a tractor trailer having a wireless sensor network, the details of which are depicted in FIG. 2. The vehicle wireless sensor network 200 according to an embodiment of the present invention, includes gateways 110-1 and 110-2 in wireless communication with a plurality of sensor modules 120-1, 120-2 . . . 120-8 at multiple locations on the vehicle 100. Gateways 110-1 and 110-2, in turn, communicate with an electronic control unit (ECU) 210, which may include an engine control unit, airbag control unit (ACU), convenience control unit (CCU), and the like, and via a cellular network 205 to a remote server 220 for maintenance/diagnostics, etc.

Sensor modules 120-1, 120-2 . . . 120-8 periodically detect information about the vehicle, such as for providing safety and convenience services to a driver (e.g. vehicle front and rear parking assistance, TPMS, air conditioning system, etc.). Thus, sensor modules 120-1, 120-2 . . . 120-8 may include an air conditioner sensor module, a front detection sensor module, a tire pressure monitoring system (TPMS) sensor module, a rear detection sensor module, cargo sensor, door sensor, humidity sensor, temperature sensor, pressure sensor, load sensor and the like which are mounted in the vehicle as illustrated in FIG. 1.

For example, ECU 210 may analyze tire pressure information received from a TPMS sensor module 120-1, and in response display the tire pressure information to notify a driver that a front left tire of the trailer has abnormality for the purpose of repair or replacement when the analyzed tire pressure information is lower than a threshold amount.

In this manner, according to an embodiment of the present invention, the information about the vehicle may be received from each of the sensor modules 120-1, 120-2 . . . 120-8 to be processed in real time by the ECU 210 for enhanced safety and convenience and transmitted to server 220 for maintenance/diagnostics, etc.

According to an exemplary embodiment, each sensor module 120-1 to 120-8 includes a single antenna whereas each gateway 110-1 and 110-2 includes multiple antennae, as discussed in greater detail below. In normal operation, most communications take place via short-range RF except when a sensor event occurs, in which case LTE is used for communicating the event to the remote server 220 (e.g. at a fleet monitoring station).

Depending upon the mounting position of each gateway 110-1 and 110-2, one or more of the sensor modules 120-1 to 120-8 may not be in optimal position relative to one or both of the gateways having regard to different fading, multipath conditions, RSSI readings, RF link budget, etc. Therefore, in accordance with an aspect of this specification a system and method are set forth for dynamically optimizing antenna performance based on RSSI (Received Signal Strength Indicator) values from the various sensor molecules 120-1 to 120-8.

Figure 3:
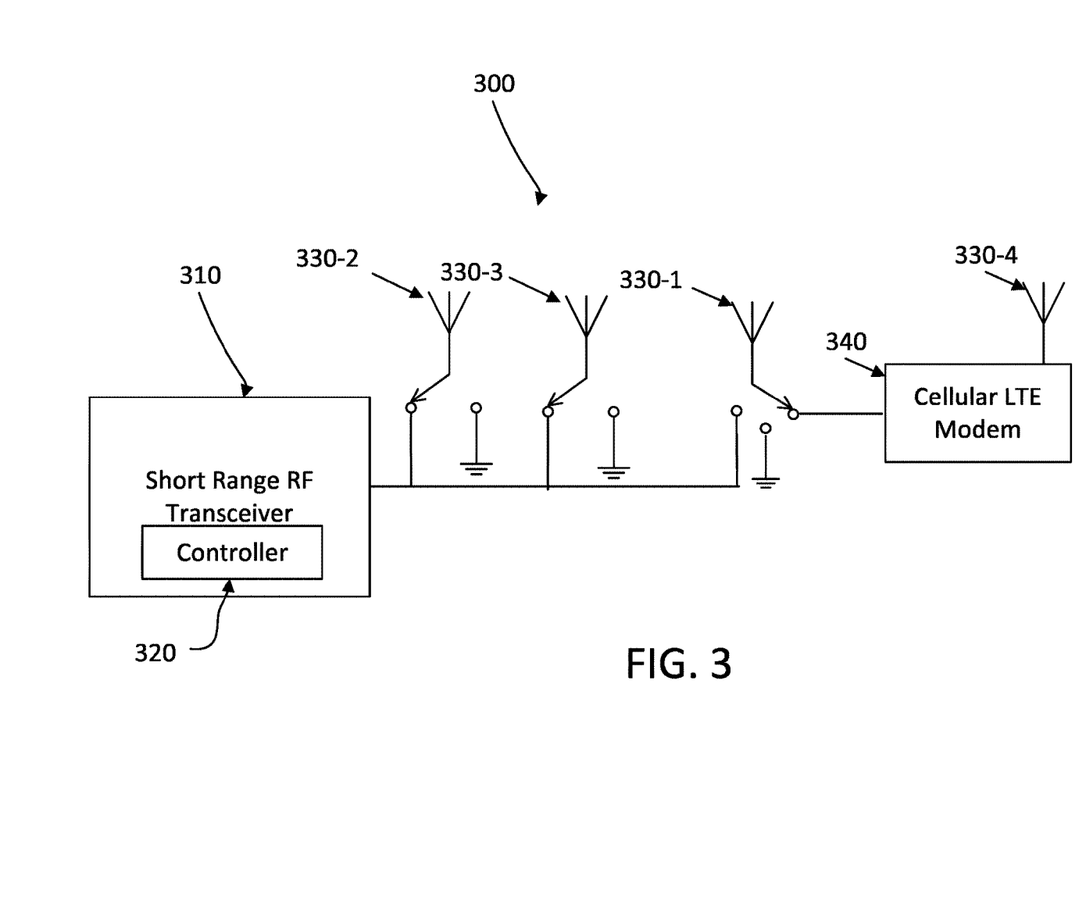
FIG. 3 is a block diagram of an exemplary gateway of the wireless sensor network of FIG. 1.

Turning to FIG. 3, an exemplary gateway 300 is shown, according to a non-limiting embodiment. Gateway 300 comprises a plurality of antennae selectively connected to a short-range radio frequency (SRF) transceiver 310 under control of a controller 320. In one embodiment, antenna 330-1 comprises a multiple-input and multiple-output (MIMO) antenna functioning as a cellular diversity antenna for communication with remote server 220 via cellular LTE modem 340 as well as 868-915 MHz/BLE short range RF (SRF) communications via SRF transceiver 310, for communications between sensor modules 120-1 to 120-8 and the gateway 300 (hereinafter MIMO antenna 330-1). Antenna 330-2 can, for example, be a SubGHz 868-915 MHz+2.4 GHz BLE short range RF antenna used for primary SRF communications (hereinafter primary antenna 330-2). Antenna 330-3 can, for example, be a 433 MHz ultra-high frequency antenna (hereinafter UHF antenna 330-3). Antenna 330-4 can, for example, be an LTE cellular main antenna connected to a cellular LTE modem 340 (hereinafter LTE cellular main antenna 330-4).

Figure 4:
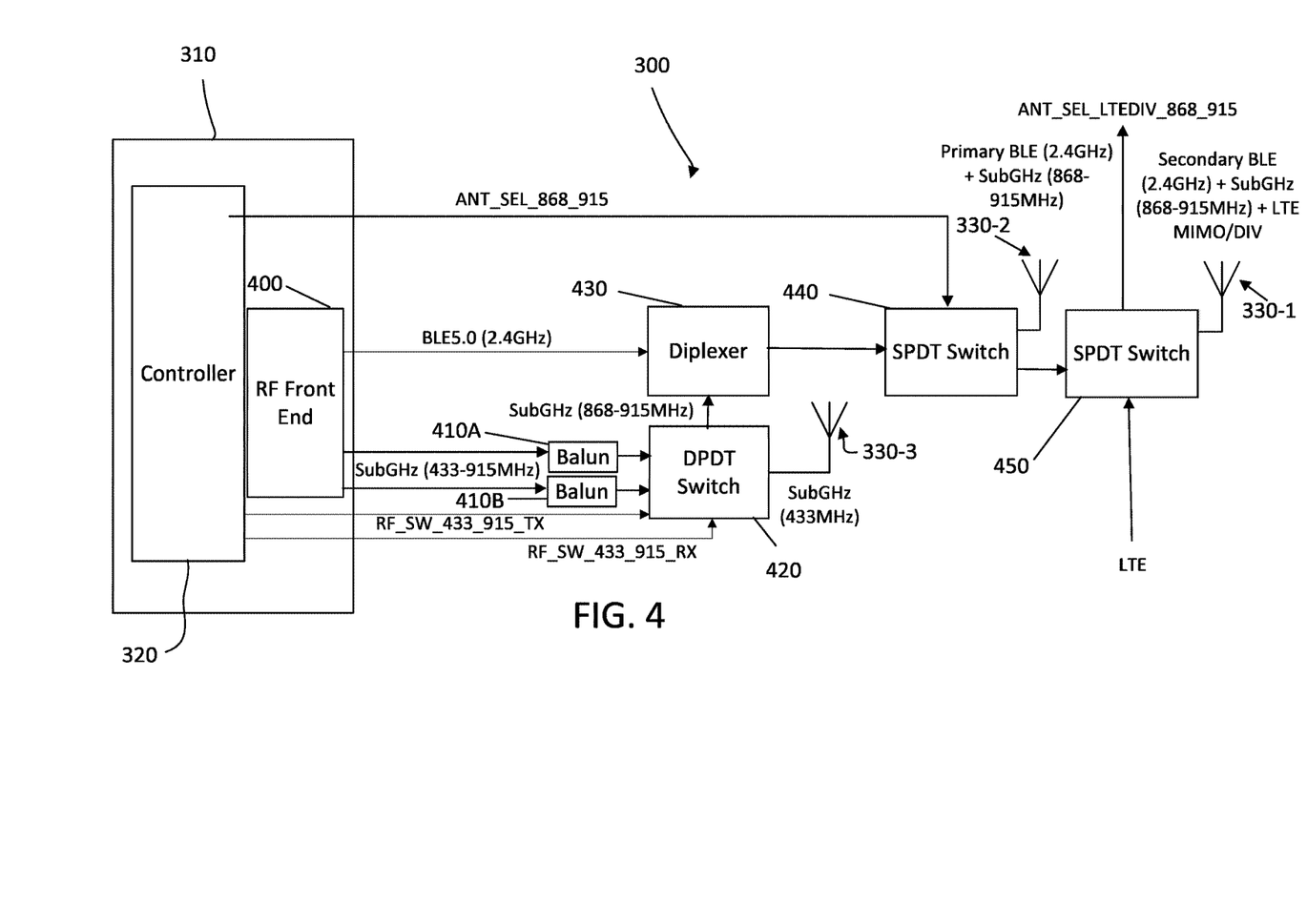
FIG. 4 is a detailed block diagram of the gateway of FIG. 3.

FIG. 4 depicts details of the gateway 300 of FIG. 3 but omits cellular LTE modem 340 and LTE cellular main antenna 330-4. In addition to the controller 320, SRF transceiver 310 includes RF front end circuitry 400 which includes conventional circuits such as a band-pass filter (BPF), RF amplifier, local oscillator (La) and/or mixer, as would be understood by a person of ordinary skill in the art. The SubGHz (433-915 MHz) signals from RF front end 400 pass through balun circuits 410A and 410B for converting between balanced and unbalanced signals, terminating at DPDT (double-pole-double-throw) switch 420. DPDT switch 420 selectively connects the SubGHz 433 signal to UHF antenna 330-3 and the SubGHz (868-915 MHz) signals to a first input port of diplexer 430, based on the RF_SW_433_915 TX and RF_SW_433_915 Rx select signal from controller 320. DPDT switch 420 therefore selects between four possible configurations (i.e. to selecting between Tx and Rx from SRF transceiver 310 and between 434 MHz and 868/915 MHz paths).

The BLE 5.0 (2.4 GHz) signals output from RF front end 400 are applied to a second input port of diplexer 430, which implements frequency-domain multiplexing onto an output port such that the BLE 5.0 (2.4 GHz) and SubGHz (868-915 MHz) signals coexist on the output without interfering with each other. The output port is connected to an SPDT (single-pole-double-throw) switch 440.

SPOT switch 440 selectively connects the multiplexed BLE 5.0 (2.4 GHz) and SubGHz (868-915 MHz) signals output from diplexer 430 to primary antenna 330-2 or to a further SPOT switch 450, based on the ANT_SEL_868_915 select signal from controller 320.

SPDT switch 450 selectively connects the multiplexed BLE 5.0 (2.4 GHz) and SubGHz (868-915 MHz) signals output from SPOT switch 440 or the LTE cellular signal to MIMO antenna 330-1, based on the ANT_SEL_LTE-DIV_868 915 select signal from controller 320.

In operation, controller 320 of SRF transceiver 310 dynamically selects one of the antennae 330-1 . . . 330-3 based on RSSI values from the sensor modules 120-1 . . . 120-8. For example, in the event that (1) the best (i.e. highest) RSSI is received from sensor module 120-1 on antenna 330-1, (2) the best RSSI is received from sensor module 120-2 on antenna 330-2, and (3) the best RSSI is received from sensor modules 120-3 . . . 120-8 on antenna 330-3, gateway short range SRF transceiver 310 can dynamically select the antennae 330-1, 330-2 and 330-3 to optimize best possible sensitivity with sensor modules 120-1, 120-2 and 120-3 . . . 120-8, respectively.

Figure 5:
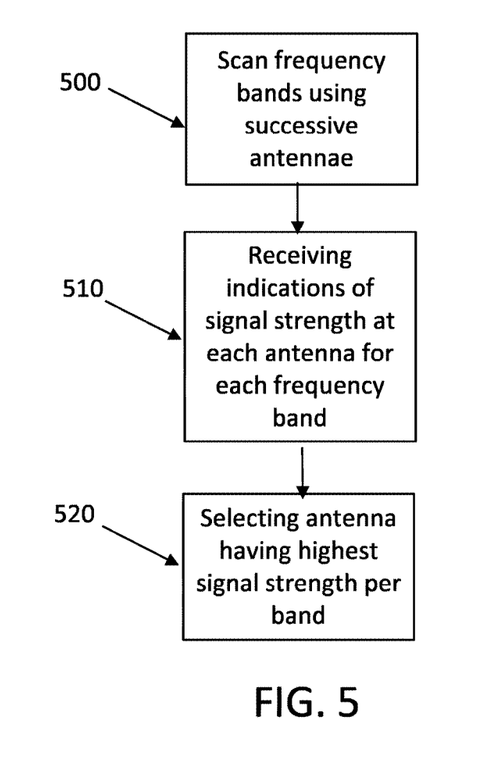
FIG. 5 depicts a method of dynamically optimizing antenna performance in the wireless sensor network of FIG. 1, according to a non-limiting embodiment.

Turning to FIG. 5, steps are depicted of a method for dynamically optimizing antenna performance in the wireless sensor network of FIGS. 1 and 2, according to a non-limiting embodiment. At step 500, SRF transceiver 310 selects the desired band, channel, frequency, modulation, and scans frequency bands by sweeping transmit power from lowest to highest and selecting one of antennae 330-1 . . . 330-3 based on highest RSSI with lowest transmit power. Next, at step 510, SRF transceiver 310 receives indications of signal strength (RSSI) for each antenna over each frequency band (e.g. 868-915 MHz/BLE, SubG 868-915 MHz, 2.4 GHz BLE, 433 MHz UHF, etc.). At step 520, SRF transceiver 310 determines optimal antenna selection based on current mounting options (e.g. changing the installed mounting position can result in variation of antenna efficiency, in which case steps 500-520 should be repeated).

Figure 6:
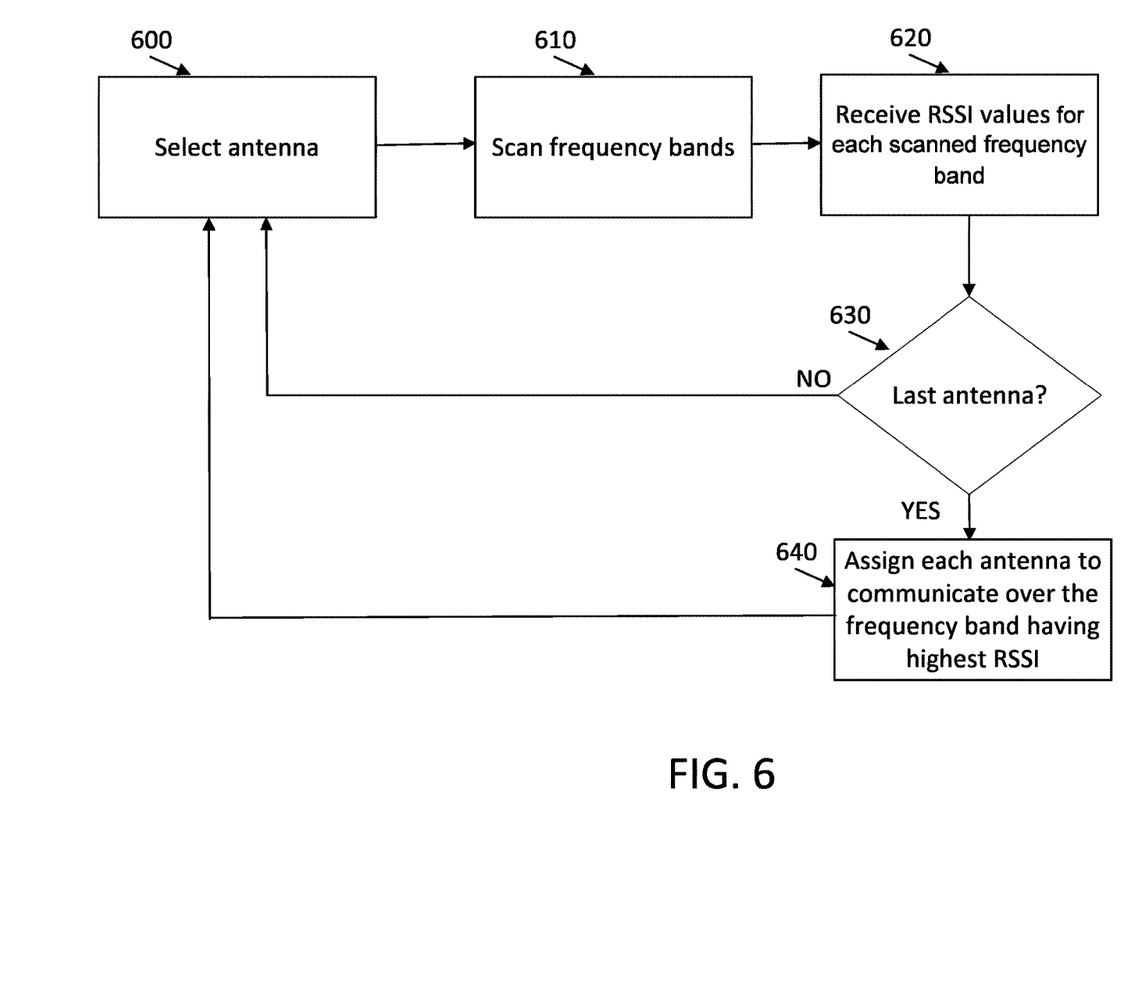
FIG. 6 depicts exemplary details of the method depicted in FIG. 5.

FIG. 6 shows steps in the method of FIG. 5, in greater detail. At step 600, a first one of the antennae 330-1 . . . 330-3 is selected (i.e. connected to short-range radio frequency SRF transceiver 310). Next, at step 610, frequency bands are scanned (e.g. 868-915 MHz, 2.4 GHz BLE, 433

MHz, etc.) and RSSI values are received for each of the sensor modules 120-1 to 120-8 (step 620). Then, at step 630, a determination is made if there is another antenna on the gateway that needs to be tested. If so (i.e. a YES at step 630), then steps 600-620 are repeated for the next antenna, until RSSI values have been received from all gateway antennae 330-1 ... 330-3 (i.e. a NO at step 630). Finally, at step 640, each antenna 330-1 ... 330-3 is selected to communicate with the respective optimal sensor module 120-1 to 120-8, based on highest RSSI value. The method is dynamic in that steps 600-640 are periodically repeated to maintain optimal performance (for example, any time new sensor module is added or removed, or in the event of a communication failure from sensor module to gateway due to external interference).

Figure 7:
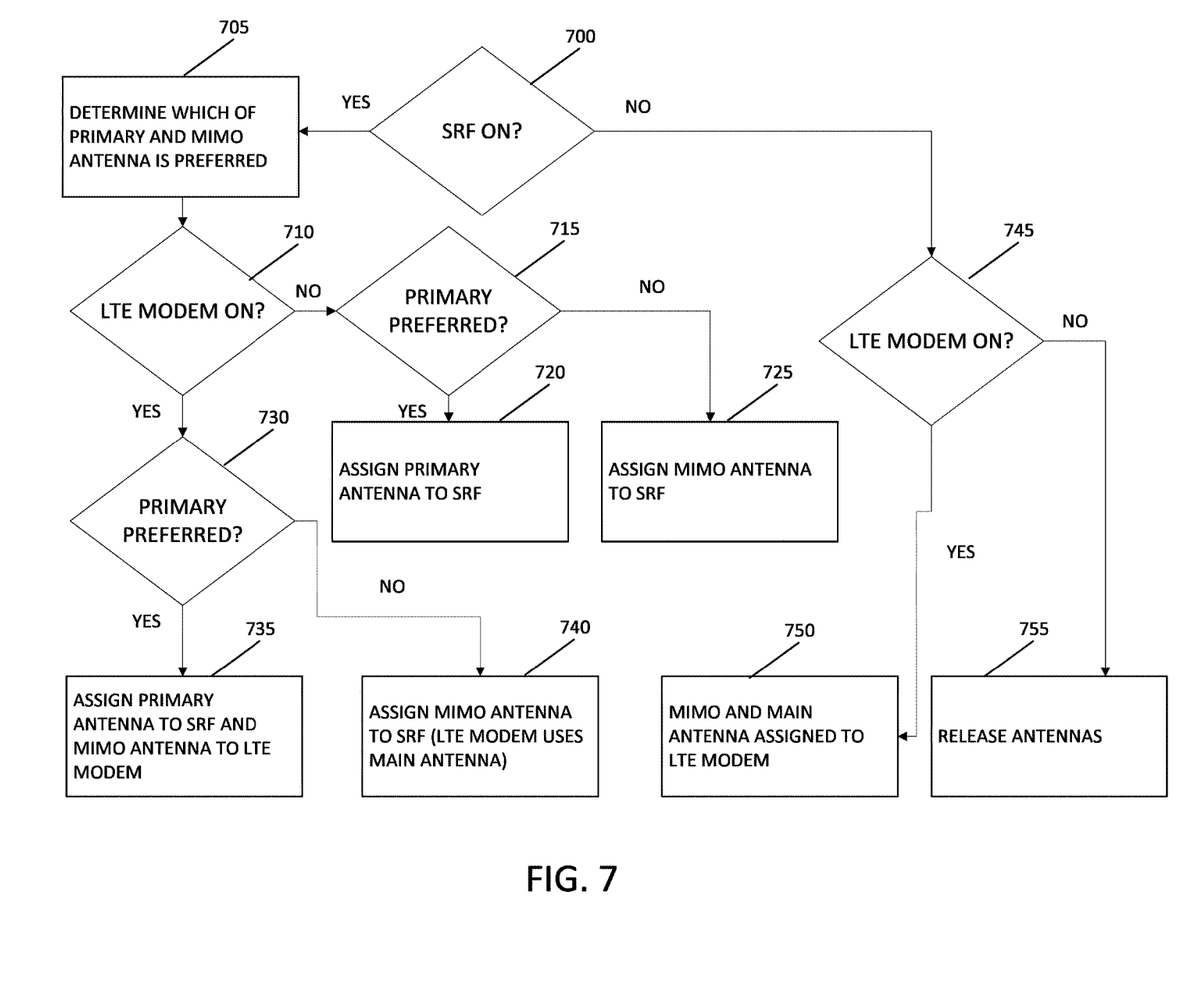
FIG. 7 depicts a method of determining which of a primary and multiple-input and multiple-output (MIMO) antenna is preferred for short-range RF communication between a gateway and sensor module, in the method of FIG. 4, according to a non-limiting embodiment.

Turning to FIG. 7, steps are depicted of a method for dynamically optimizing antenna performance in the wireless sensor network of FIGS. 1 and 2, by selecting between the primary antenna 330-2 and MIMO antenna 330-1, according to a non-limiting embodiment. At step 700, a determination is made as to whether the SRF transceiver 310 is on. When the SRF transceiver is on while the cellular LTE modem 340 is off, the SRF transceiver 310 determines (at step 705) whether to use the primary or MIMO antenna depending on RF link conditions between the gateway and sensor module. This is determined by performing a power sweep and RSSI measurement between, as discussed above in connection with FIG. 6.

At step 710, a determination is made as to whether the cellular LTE modem 340 is on. If both the SRF transceiver 310 and cellular LTE modem 340 are on at the same time (i.e. a YES at step 710), and if the SRF transceiver 310 determines that the MIMO antenna 330-1 is the preferred antenna (i.e. a NO at step 730), then at step 740 the MIMO antenna 330-1 is assigned to SRF transceiver 310 and the cellular LTE modem 340 uses the LTE cellular main antenna 330-4 only and does not enable the MIMO antenna 330-1 (LTE cat1 modem waiver may be required).

If the SRF transceiver 310 determines that the primary antenna 330-2 is the preferred antenna (i.e. a YES at step 730), then at step 735 the primary antenna 330-2 is assigned to SRF transceiver 310 and the cellular LTE modem 340 switches back to using both the LTE cellular main antenna 330-4 and MIMO antenna 330-1.

If, at step 710, it is determined that the cellular LTE modem 340 is off, then the SRF transceiver 310 has full control to use the optimal antenna. If the SRF transceiver 310 determines that the MIMO antenna 330-1 is the preferred antenna (i.e. a NO at step 715), then at step 725 the MIMO antenna 330-1 is assigned to SRF transceiver 310. If the SRF transceiver 310 determines that the primary antenna 330-2 is the preferred antenna (i.e. a YES at step 715), then at step 720 the primary antenna 330-2 is assigned to SRF transceiver 310.

If, at step 700, a determination is made that the SRF transceiver 310 is off, then if the cellular LTE modem 340 is on (i.e. a YES at step 745), both the LTE cellular main antenna 330-4 and secondary MIMO antenna 330-1 are assigned to the cellular LTE modem 340 for best performance (step 750). If the cellular LTE modem 340 is off (i.e. a NO at step 745), all antennas are released (step 755).

Although the method depicted in FIG. 7 is directed to optimizing antenna performance by selecting between the primary antenna 330-2 and MIMO antenna 330-1, it is contemplated that the method be extended to selection between the primary antenna 330-2, MIMO antenna 330-1 and additional antenna, such as SubGHz 433 MHz UHF antenna 330-3, as discussed more generally above with reference to FIG. 6.

According to another aspect, antennae 330-1 ... 330-3 can be terminated when not selected in order to compensate for antenna de-sensing. For example, during LTE cellular operation MIMO antenna 330-1 can de-sense short range antenna 330-2 that has less isolation from cellular LTE main antenna 330-4. Therefore, the MIMO antenna 330-1 can be terminated (i.e. connected to ground) to prevent de-sensing of the short-range RF antenna 330-2. It will be appreciated, however, that terminating of one antenna can also change the antenna pattern of the other antennas.

According to yet another aspect, it is contemplated that, depending upon system operation, multiple antennae 330-1 ... 330-3 can be time multiplexed to achieve optimal system performance. For example, short range RF communication can be mutually exclusive to LTE cellular operation. In one embodiment, the MIMO antenna 330-1 defaults to cellular transmission of data to server 220 and is only used for short range RF communication when not transmitting cellular data. In another embodiment, initially the sensor modules 120-1 to 120-8 use short range RF links to send sensor data to the gateways 110-2 and 110-2 and once the data transmission is complete, the MIMO antenna 330-1 reverts to cellular communication with server 220. Other examples include multiplexing between cellular LTE modem 340 and SRF transceiver 310, between SRF bands (868, 915, 434, etc), between SRF channels within bands, and between LTE main antenna 330-4 and MIMO antenna 330-1 for cellular diversity vs LTE main only.

Those skilled in the art will appreciate that in some embodiments, the functionality of the SRF transceiver 310 may be implemented using pre-programmed hardware or firmware elements (e.g., application specific integrated circuits (ASICs), field programmable gate arrays (FPGAs), etc.), or other related components. Also, it is contemplated that the switched antennae 330-1 to 330-3 can be used to reduce radiated spurious emissions for FCC or CE caused by adjacent antennas (e.g. the 2.4 GHZ BLE antenna 330-2 can cause RSE emissions for the cellular LTE modem 340).

The scope of the claims should not be limited by the embodiments set forth in the above examples but should instead be given the broadest interpretation consistent with the description as a whole.

The invention claimed is:

1. A method of dynamically optimizing antenna performance in a wireless sensor network, comprising:
   scanning multiple frequency bands via successive ones of a plurality of antennae for receiving indications of signal strength at each antenna for each scanned frequency band; and
   selecting one of said plurality of antennae having highest signal strength over one of said multiple frequency bands for communication over said one of said multiple frequency bands, wherein scanning said multiple frequency bands for receiving indications of signal strength further comprises:
   a) selecting respective ones of said plurality of antennae;
   b) scanning said multiple frequency bands via each selected antenna;
   c) receiving a RSSI value for each selected antenna at each scanned frequency band; and
   d) if all of said respective ones of said plurality of antennae have been selected then assigning each respective antenna to communicate over a frequency band having highest RSSI value for said respective antenna, and otherwise repeating steps a), b) and c) until all of said respective ones of said plurality of antennae have been selected.

2. The method of claim 1, further comprising terminating each of said plurality of antennae when not selected to compensate for antenna de-sensing.

3. The method of claim 1, wherein each of said antennae is assigned to communicate over a frequency band having highest RSSI value using time multiplexing.

4. A system for dynamically optimizing antenna performance comprising:
a plurality of sensor modules;
at least one gateway comprising a plurality of antennae and a transceiver;
said transceiver including an RF (radio frequency) front end and a controller configured for selectively connecting said RF front end to said plurality of antennae, said controller configured to:
scan multiple frequency bands via successive ones of said plurality of antennae for receiving indications of signal strength at each antenna for each scanned frequency band; and
selectively connecting said RF front end to one of said plurality of antennae having highest signal strength over one of said multiple frequency bands for communication over said one of said multiple frequency bands, wherein said controller is further configured to:
a) select respective ones of said plurality of antennae;
b) scan said multiple frequency bands via each selected antenna;
c) receive a RSSI value for each selected antenna at each scanned frequency band; and
d) if all of said respective ones of said plurality of antennae have been selected then assign each respective antenna to communicate over a frequency band having highest RSSI value for said respective antenna, and otherwise repeat steps a), b) and c) until all of said respective ones of said plurality of antennae have been selected.

5. The system of claim 4, wherein at least one of said plurality of antennae is a multiple-input and multiple-output (MIMO) antenna for communication over a cellular frequency band as well as over 868-915 MHz/BLE frequency band for short range communications with at least one of said sensor modules.

6. The system of claim 4, wherein at least one of said plurality of antennae is a SubG antenna for short range RF communications with at least one of said sensor modules.

7. The system of claim 4, wherein at least one of said plurality of antennae is a UHF (ultra-high frequency) antenna.

8. The system of claim 4, wherein at least one of said plurality of antennae is an LTE cellular main antenna.

9. The system of claim 4, wherein at least one of said plurality of antennae is an LTE diversity antenna.

10. A system for dynamically optimizing antenna performance in a wireless sensor network, comprising:
a plurality of sensor modules;
at least one gateway comprising a plurality of antennae and a transceiver;
said transceiver including an RF (radio frequency) front end and a controller configured for selectively connecting said RF front end to said plurality of antennae, said controller configured to:
scan multiple frequency bands via successive ones of said plurality of antennae for receiving indications of signal strength at each antenna for each scanned frequency band; and
selectively connecting said RF front end to one of said plurality of antennae having highest signal strength over one of said multiple frequency bands for communication over said one of said multiple frequency bands, wherein said gateway is adapted for communicating with said plurality of sensor modules via RF (radio frequency) and with a remote server via cellular modem over a cellular network.

11. The gateway of claim 10, wherein said plurality of antennae comprises at least a primary antenna for RF communications, a multiple-input and multiple-output (MIMO) antenna for both RF and cellular communications and a cellular LTE main antenna.

12. The gateway of claim 11 wherein said controller is configured to:
determine whether the RF transceiver is on;
if the RF transceiver is on and the cellular modem is on and if the primary antenna has higher signal strength than the MIMO antenna then connecting the primary antenna to the RF front end and connecting the MIMO antenna to the cellular modem; or
if the MIMO antenna has higher signal strength than said primary antenna then connecting the MIMO antenna to the RF front end and connecting the cellular LTE main antenna to the cellular modem; and
if the RF transceiver is on and the cellular modem is off and if the primary antenna has higher signal strength than said MIMO antenna then connecting the primary antenna to the RF front end; or
if the MIMO antenna has higher signal strength than said primary antenna then connecting the MIMO antenna to the RF front end; and
if the RF transceiver is off and the cellular modem is on then connecting the MIMO antenna and the cellular LTE main antenna to the cellular modem.

13. The gateway of claim 11, further comprising at least one switch for selectively connecting said RF front end to one of said plurality of antennae.

14. The gateway of claim 13, wherein said at least one switch comprises a first SPDT (single-pole-double-throw) switch connected to the primary antenna and a second SPDT switch connected to the MIMO antenna and an output of the first SPDT switch for selectively connecting one of either the primary antenna or MIMO antenna to the RF front end in response to receiving an antenna select signal from the controller.

15. The gateway of claim 14, further comprising:
a UHF antenna; and
a DPDT (double-pole-double-throw) switch for selectively connecting the UHF antenna to the RF front end in response to receiving a further antenna select signal from the controller.

16. A non-transient computer readable medium containing program instructions for causing a computer to perform a method of dynamically optimizing antenna performance in a wireless sensor network, comprising:
scanning multiple frequency bands via successive ones of a plurality of antennae for receiving indications of signal strength at each antenna for each scanned frequency band;
selecting one of said plurality of antennae having highest signal strength over one of said multiple frequency bands for communication over said one of said multiple frequency bands; and wherein each of said antennae is assigned to communicate over a frequency band having highest RSSI value using time multiplexing.

17. The non-transient computer readable medium of claim 16, wherein scanning said multiple frequency bands for receiving indications of signal strength further comprises:
   a) selecting respective ones of said plurality of antennae;
   b) scanning said multiple frequency bands via each selected antenna;
   c) receiving a RSSI value for each selected antenna at each scanned frequency band; and
   d) if all of said respective ones of said plurality of antennae have been selected then assigning each respective antenna to communicate over a frequency band having highest RSSI value for said respective antenna, and otherwise repeating steps a), b) and c) until all of said respective ones of said plurality of antennae have been selected.

\* \* \* \* \*